(12) United States Patent
Howard et al.

(10) Patent No.: US 11,047,436 B2
(45) Date of Patent: Jun. 29, 2021

(54) BRAKE HOUSING ASSEMBLY

(71) Applicant: Meritor Heavy Vehicle Braking Systems (UK) Limited, Gwent (GB)

(72) Inventors: Alex Howard, Cwmbran (GB); Jon Dus, Cwmbran (GB); Dave Hubbard, Cwmbran (GB); Bobby Kent Potts, Jr., Troy, MI (US); Rohit Singla, Cwmbran (GB); Daniel Philpott, Goodrich, MI (US)

(73) Assignee: Meritor Heavy Vehicle Braking Systems (UK) Limited, Cwmbran (GB)

( * ) Notice: Subject to any disclaimer, the term of this patent is extended or adjusted under 35 U.S.C. 154(b) by 244 days.

(21) Appl. No.: 16/219,229

(22) Filed: Dec. 13, 2018

(65) Prior Publication Data

US 2019/0186568 A1 Jun. 20, 2019

(30) Foreign Application Priority Data

Dec. 15, 2017 (EP) .................................... 17207583

(51) Int. Cl.
| | |
|---|---|
| *F16D 55/226* | (2006.01) |
| *F16D 65/66* | (2006.01) |
| *F16D 65/00* | (2006.01) |
| *F16D 55/33* | (2006.01) |
| *F16D 65/18* | (2006.01) |
| *F16D 55/00* | (2006.01) |

(52) U.S. Cl.
CPC ....... *F16D 65/0068* (2013.01); *F16D 55/226* (2013.01); *F16D 55/33* (2013.01); *F16D 65/18* (2013.01); *F16D 2055/0016* (2013.01); *F16D 2250/0007* (2013.01)

(58) Field of Classification Search
CPC .. F16D 65/0065; F16D 65/0075; F16D 65/16; F16D 65/18; F16D 55/226
USPC .............................. 188/71.1, 72.1, 72.7, 72.9
See application file for complete search history.

(56) References Cited

U.S. PATENT DOCUMENTS

| | | | | |
|---|---|---|---|---|
| 5,433,301 | A * | 7/1995 | Eshghy | ................. F16D 65/092 188/250 G |
| 6,817,452 | B2 * | 11/2004 | Heinlein | ............... F16D 65/183 188/72.9 |
| 10,487,892 | B2 * | 11/2019 | Philpott | .................... B22C 9/06 |
| 2010/0294601 | A1 | 11/2010 | Kraus et al. | |

(Continued)

FOREIGN PATENT DOCUMENTS

| | | |
|---|---|---|
| DE | 102015112497 A1 | 2/2017 |
| EP | 1475551 A2 | 11/2004 |

OTHER PUBLICATIONS

European Patent Office, Extended European Search Report for related Application No. 17207583.0-1012, dated Jul. 4, 2018.

*Primary Examiner* — Christopher P Schwartz
(74) *Attorney, Agent, or Firm* — Brooks Kushman PC

(57) ABSTRACT

A brake housing assembly including a brake housing and a bearing support. The brake housing may have a recess defining a recess axis, the recess having a base and a recess wall, the base defining a base contour. The bearing support may have a projection defining a bearing support axis, the projection having an end and a projection wall, the end defining an end contour corresponding to the base contour such that with the end in engagement with the base the end contour and base contour cooperate to align the bearing support axis with the recess axis.

19 Claims, 6 Drawing Sheets

(56) References Cited

U.S. PATENT DOCUMENTS

| | | | |
|---|---|---|---|
| 2011/0303496 A1* | 12/2011 | Plantan | B23P 9/04 |
| | | | 188/72.4 |
| 2013/0020153 A1* | 1/2013 | Moeller | F16D 65/0043 |
| | | | 188/72.1 |
| 2016/0017946 A1* | 1/2016 | Sandberg | F16D 65/66 |
| | | | 188/71.8 |

* cited by examiner

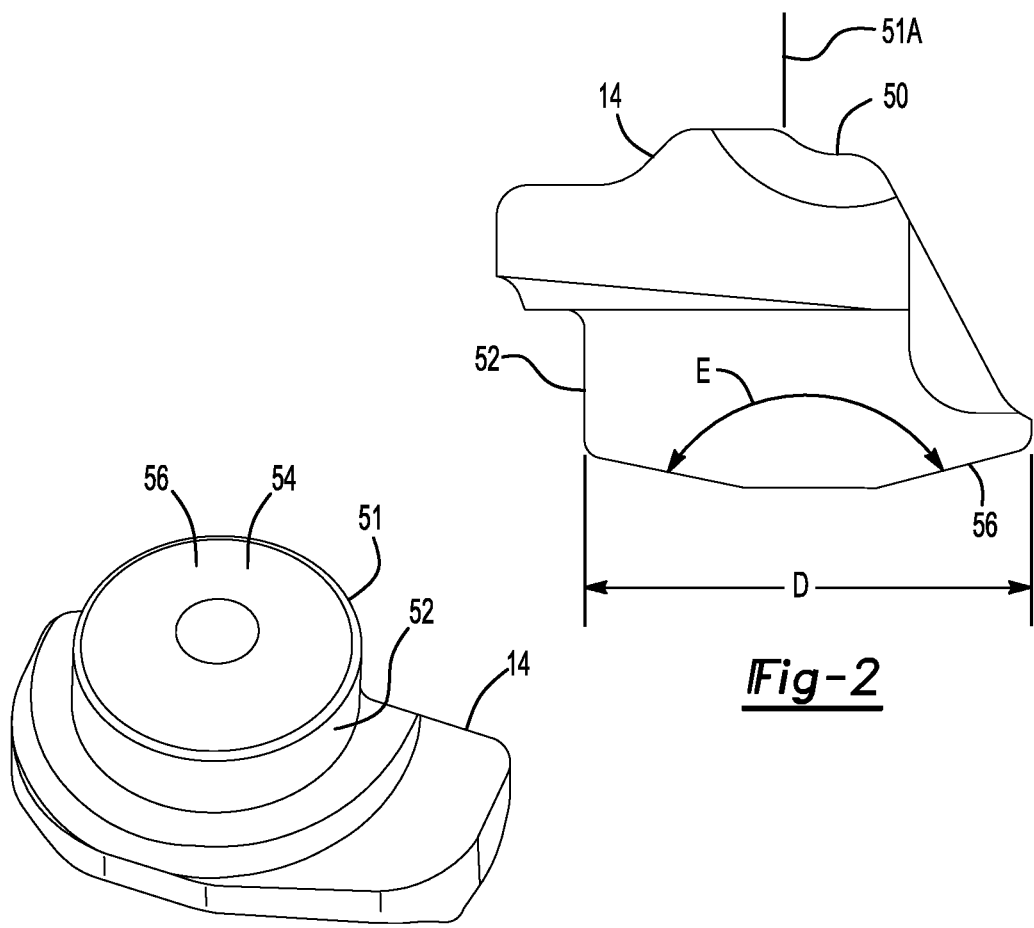
Fig-2
Fig-3
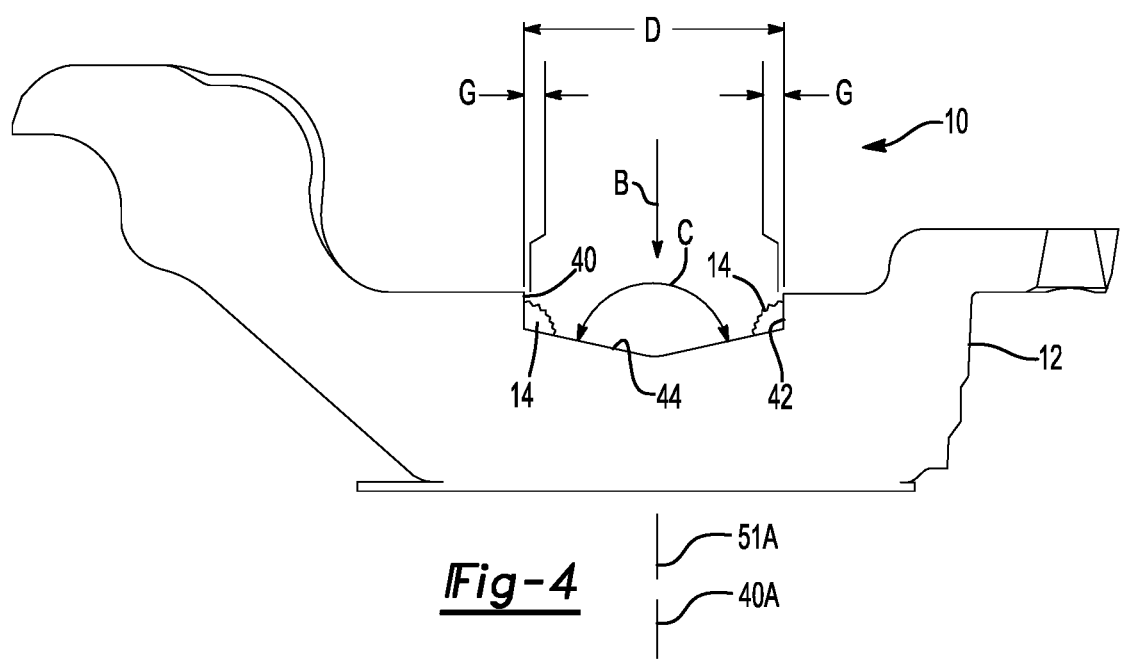
Fig-4

BRAKE HOUSING ASSEMBLY

TECHNICAL FIELD

The present invention relates to a brake housing assembly, for example a brake housing assembly for a disc brake of; for example, a road-going vehicle.

BACKGROUND

Disc brakes are known wherein an actuator mechanism housed within a cavity of a brake housing is selectively operated to move brake pads into engagement with a rotor such as a brake disc thereby applying a brake. The actuator mechanism can be air operated. When the brake is applied, the actuator mechanism applies a force to an in-board brake pad and the consequential reaction force is applied between the actuator mechanism and the brake housing. The reaction force causes the brake housing to move in an inward direction thereby causing an outboard brake pad to move into engagement with an opposite side of the brake disc, thereby clamping the disc between the brake pads and applying the brake, which generates a braking torque at the vehicle wheel.

As such, the brake housing is a stressed component and must be capable of withstanding the actuation forces and must also be capable of withstanding multiple force applications which lead to fatigue damage, as is the case with road vehicles.

Due to space limitations such as the associated wheel, axle, suspension components, body components of the vehicle and the like, the design of the brake housing is thereby constrained.

As such, an object of the present invention is to provide a brake housing assembly that can be fitted within an appropriate space envelope defined by associated vehicle components, but which will be able to withstand actuation forces, environmental loads and achieve the required fatigue life during its service use.

According to an aspect of the present invention there is provided a brake housing assembly as defined in claim 1.

According to an aspect of the present invention, there is provided a brake housing assembly as defined in claim 9.

BRIEF DESCRIPTION OF THE DRAWINGS

The invention will now be described by way of example only with reference to the accompanying drawings in which:

FIG. 2 is a side view of a bearing support for use with the brake housing of FIG. 1 in a brake housing assembly of the present invention, FIG. 3 is an isometric view of the bearing support of FIG. 2, FIG. 4 is a cut-away plan view of the bearing support (only parts of which are shown) of FIGS. 2 and 3 installed in the brake housing of FIG. 1.

DETAILED DESCRIPTION

Figure 1:
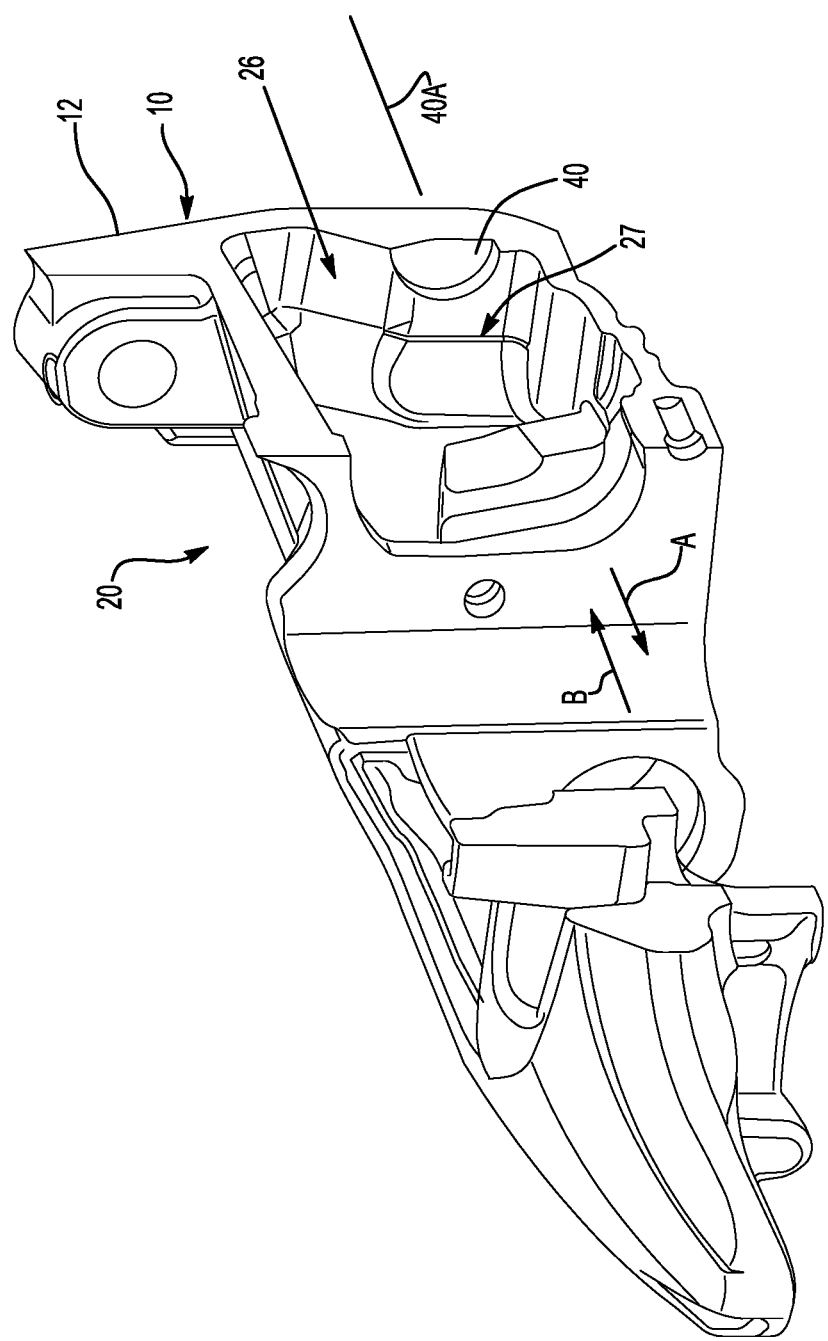
FIG. 1 is an isometric cutaway view of a brake housing for use in a brake housing assembly of the present invention.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

With reference to FIGS. 1 to 4, there is shown a brake housing assembly 10 including by a brake housing 12 and a bearing support 14. The brake housing 12 includes a housing portion 20 which, in use, is fitted on an in-board side of a brake disc or brake rotor (not shown) and an outboard portion 22 which, in use, is fitted on an outboard side of the brake disc. The outboard portion is connected to the housing portion via bridges 24 (only one of which is shown). The housing portion 20 includes a chamber 26 which, in use, receives an air operated actuating mechanism (not shown) operable to engage the brake pads (not shown) with the brake disc to apply the brake. The actuating mechanism also allows release of the brake. The actuating mechanism includes an operating shaft (not shown) which is pivotable via two bearing supports 14 (only one of which is shown).

When the brake is applied, the actuator mechanism applies a force in the direction of arrow A to the in-board brake pad which is thereby moved into engagement with the brake disc in order to apply the brake. In order for the actuator mechanism to apply the force in the direction of arrow A, the actuator mechanism must apply a consequential reaction force in the direction of arrow B and this reaction force is applied through the bearing support 14 to the brake housing 12 in the region of the two recesses 40 (only one of which is shown) associated with the two bearing supports 14.

The present invention improves the design of the interaction between the bearing support and the brake housing so as to reduce localized stresses in the brake housing 12 in the region of the bearing support 14, thereby improving the ultimate strength and fatigue life of the brake housing in this relatively highly stressed region.

Recess 40 has a recess wall 42 which is cylindrical and has a diameter D. The recess also has a base 44 which in this example is conical and has an included angle C of 155°. The recess therefore defines a recess axis 40A. The brake housing 12 may be a cast component and the base 44 may be a machined surface, for example, a drill or other suitable cutting tool could be used to form the machined base 44 in the casting of the brake housing 12. The recess wall 42 may also have a machined surface. However in further embodiments, the recess wall 42 may be an "as-cast" surface in the final brake housing assembly, thereby requiring fewer/simpler machining operations.

The bearing support 14 includes a bearing support surface 50 about which the operating shaft of the actuator mechanism pivots. The bearing support also includes a projection 51 which includes a generally cylindrical projection wall 52 and an end 54. End 54 has a frusto-conical surface 56 having an included angle E of 155°, i.e., the same included angle as angle C of the base 44 of the recess 40. The projection therefore defines a bearing support axis 51A.

Significantly, the external diameter d of the projection wall 52 is smaller than the internal diameter D of the recess wall 42 of the recess 40. As such, when the bearing support is assembled into the recess 40 of the brake housing 12 as shown in FIG. 4 there is a gap G (shown exaggerated) between the projection wall 52 of the projection 51 of the bearing support and the recess wall 42 of the recess 40.

As explained above, when the actuator mechanism is operated to apply the brake, a reaction force is created in the direction of arrow B. As best seen in FIG. 4, the reaction force is generally in line with the recess axis 40A and bearing support axis 51A. In particular, when the reaction force is applied to the bearing support 14 the reaction force forces the frusto-conical surface 56 of end 54 into engagement with the base 44 of the recess 40. Because the contour of the base, i.e., the conical surface has an included angle of 155° which corresponds to the contour of the frusto-conical surface 56 of the end 54 (which also has an included angle of) 155°, then as the reaction force is applied through the bearing support 14 to the housing 12, the frusto-conical surface 56 and conical surface of the base 44 naturally align themselves thereby naturally aligning the recess axis 40A with the bearing support axis 51A. With the recess axis aligned with the bearing support axis, then the generally cylindrical wall 52 of the bearing support 14 will become centralized within the cylindrical recess 42 and an even gap G will be created between the recess wall 42 and projection 51. Because no part of the projection wall 52 is in contact with the recess wall 42 by virtue of gap G, then no forces can be transmitted from the bearing support to the brake housing via recess wall 40. Accordingly, all the forces transmitted from the bearing support 14 to the brake housing 12 are transmitted via the frusto-conical surface 56 into the brake housing 12 via the base 44 of the recess 40.

For certain designs this is advantageous since the forces are transmitted to the brake housing in a region of the brake housing capable of withstanding those forces. Conversely, certain brake housings may have relatively high stress regions in a corner of the brake housing chamber, such as corner 27 (see FIG. 1) and therefore by ensuring a clearance between the projection wall 52 and recess wall 42 proximate this corner results in lower stresses being created in such a corner.

The bearing support surface 50 may be part cylindrical to act as a support surface against which the operating shaft pivots and reacts. In such circumstances it is an interaction between the part cylindrical bearing support surface and the operating shaft that can position the bearing support 14 in its correct angular orientation.

Figure 5:
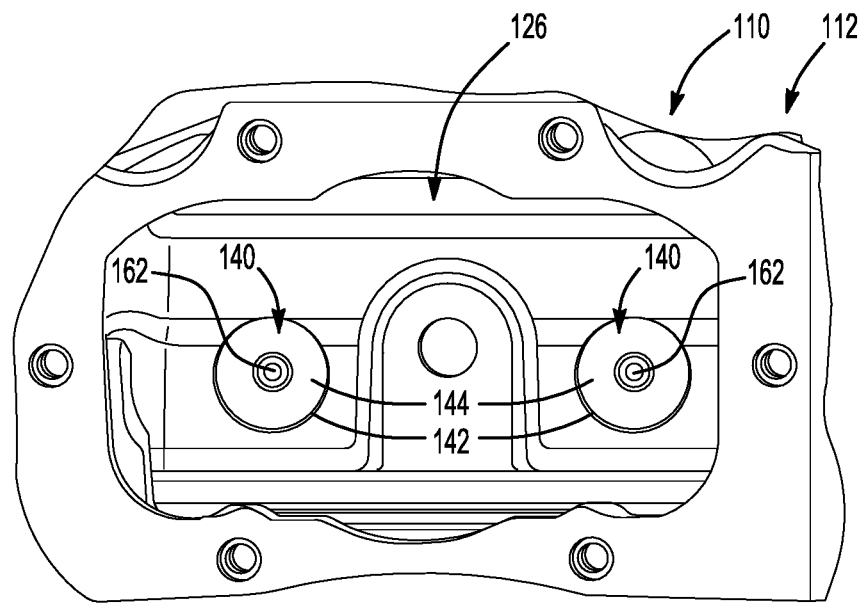
FIG. 5 is a second embodiment of a brake housing for use in a brake housing assembly according to the present invention.
Figure 6:
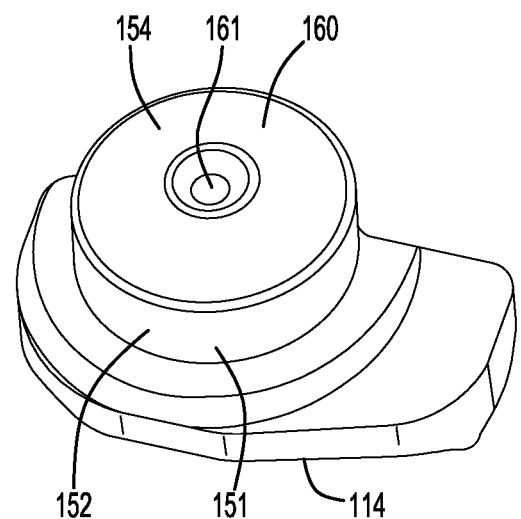
FIG. 6 shows an isometric view of a bearing support for use with the brake housing of FIG. 5 in a brake housing assembly according to the present invention.

With reference to FIGS. 5 and 6 there is shown a further embodiment of a brake housing assembly 110 with components which perform substantially the same function as those of brake housing assembly 10 labelled 100 greater.

In this case the end 154 of the projection 152 defines part of a torus 160 which has an end recess 161. The base 144 has a corresponding base projection 162. In this example end 154 defines an end contour having an end recess which corresponds to a contour of the base 44 which has a base projection 162 and it is the engagement between the contour of base 144 and the contour of end 154 that co-operate to align the bearing support axis with the recess axis thereby centralizing the projection 151 within recess 140 to provide a gap (the equivalent gap G of FIG. 4) with consequential benefits of reducing stresses, for example in a corner of the brake housing chamber.

Figure 7:
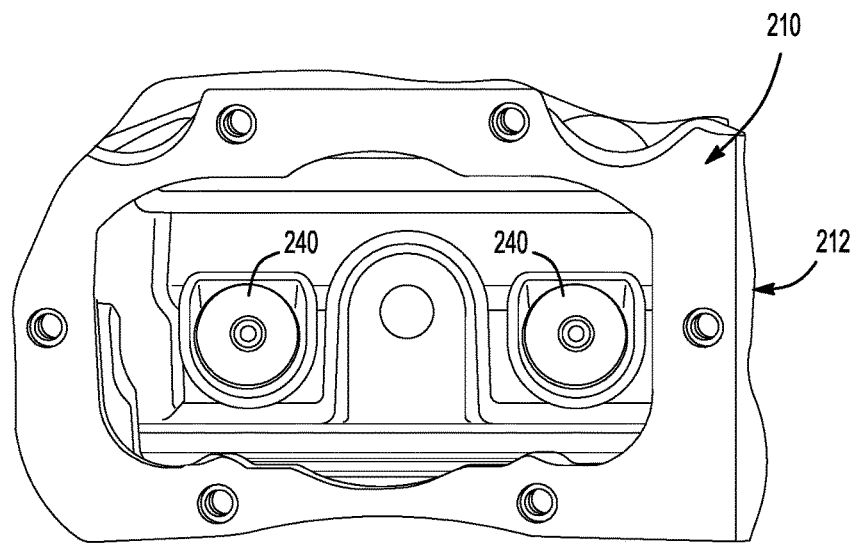
FIG. 7 is a third embodiment of a brake housing for use in a brake housing assembly according to the present invention.
Figure 8:
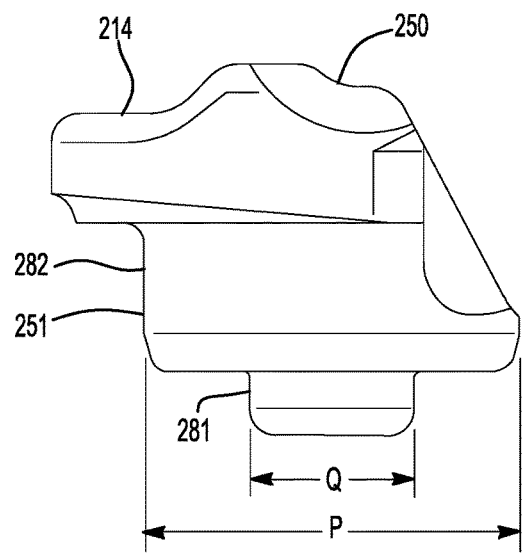
FIG. 8 is a side view of a bearing support for use with the brake housing of FIG. 7 in a brake housing assembly according to the present invention.
Figure 9:
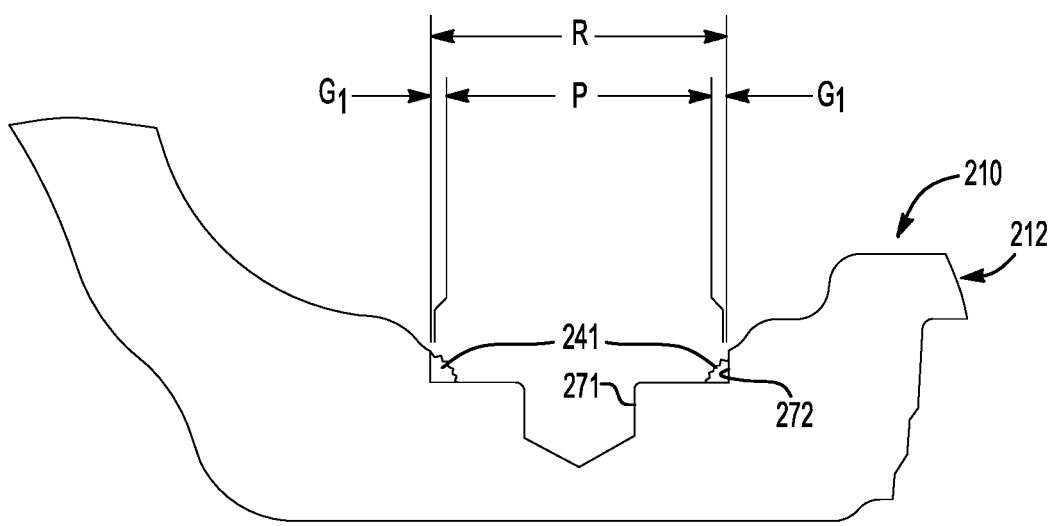
FIG. 9 is a plan view showing the bearing support of FIG. 8 installed in the brake housing of FIG. 7.
Figure 10:
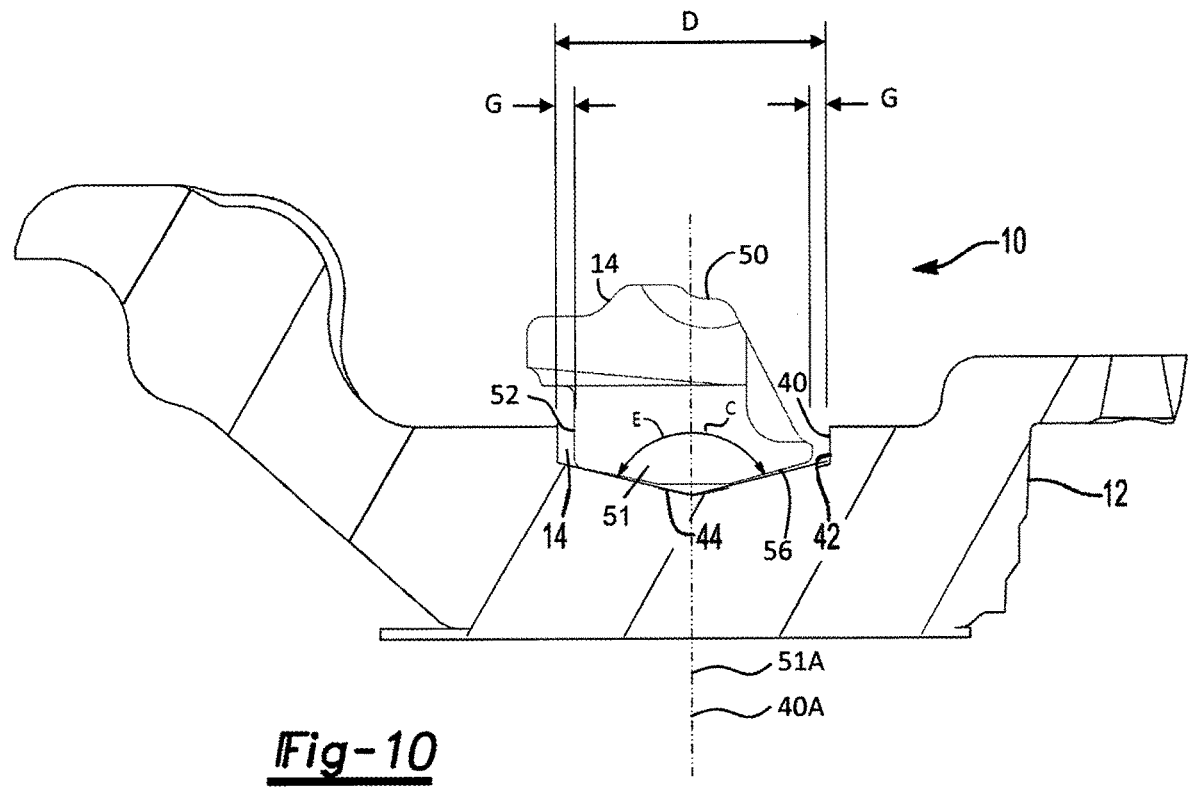
FIG. 10 is a section view along section line 10-10 showing the bearing support of FIG. 2 installed in the brake housing of FIG. 1.
Figure 11:
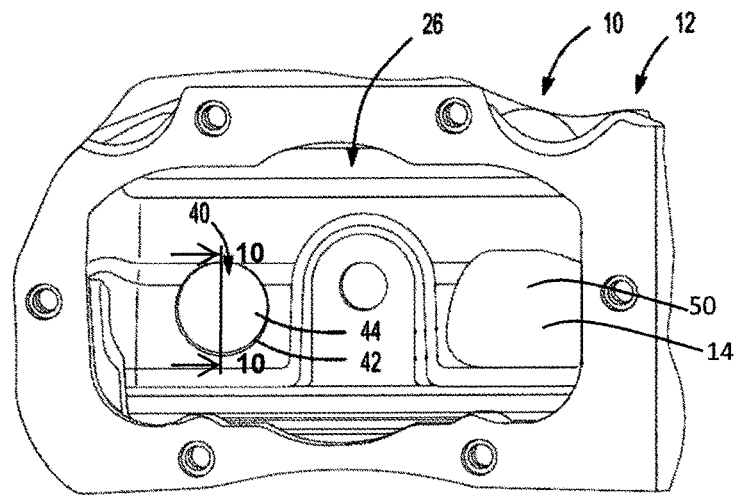
FIG. 11 is a side view of the bearing support of FIG. 2 installed in the brake housing of FIG. 1.

With reference to FIGS. 7 to 9 there is shown a further embodiment of a brake housing assembly 210 with components which perform substantially the same function as those of brake housing assembly 10 are labelled 200 greater.

In this case, the projection 251 has a first projection wall 281 and a second projection wall 282. In this case the first projection wall is cylindrical. The second projection wall 282 is generally cylindrical. The diameter of the generally cylindrical portion of the second projection wall 282 is P and the diameter of the first projection wall 281 is Q. As will be appreciated the diameter Q of the first projection wall is significantly less than the diameter P of the second projection wall.

The recess 240 includes a first recess wall 271 and a second recess wall 272. The second recess wall 272 has a diameter R which is larger in diameter than the diameter P of the second projection wall 282. Accordingly, a gap G1 (shown exaggerated in FIG. 9) is created between the second recess 272 and the second projection wall 282. The projection 251 is centralized in the recess 240 by virtue of the fit of the diameter of the first recess wall 271 and the diameter Q of the first projection wall 281. Thus, the first recess wall 271 and first projection wall can be sized to be a press-fit or a close fit. Where the first recess wall 271 and first projection wall 281 are sized to be a close fit, then the sizes and tolerances on the diameters of the first recess wall 271, second recess wall 272, first projection wall 281 and second projection wall 282 are such so as to ensure a gap G1 between the second recess wall 272 and second projection wall 282. As such, it is not possible for reaction forces to be transmitted from the second projection wall 282 of the bearing support 214 to the second recess wall 272 of the brake housing and accordingly stresses in the brake housing 212 for example in a corner of the chamber 216 are minimized.

As shown in FIGS. 1, 5 and 7, the recesses 40, 140 and 240 are all "blind" recesses, in other words the recesses are not "through" recesses. In further embodiments, recesses need not be blind recesses.

As shown in FIGS. 2 and 4 the included angles C and E are both 155°. In further embodiments any appropriate included angle could be used, for example an angle between 110° and 170° could be used. Preferably an angle between 150° and 170° could be used. More preferably an angle between 150° and 160° could be used.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A brake housing assembly comprising:
a brake housing having a recess defining a recess axis, the recess having a base and a recess wall, the base defining a base contour; and
a bearing support having a projection defining a bearing support axis, the projection having an end and a projection wall, the end defining an end contour corresponding to the base contour such that with the end in engagement with the base the end contour and base contour cooperate to align the bearing support axis with the recess axis.

2. The brake housing assembly of claim 1 wherein the end contour is conical or frusto-conical.

3. The brake housing assembly of claim 2 wherein the end contour has a conical or frusto-conical surface that has an included angle of between 110° and 170°.

4. The brake housing assembly of claim 2 wherein the base contour is conical or frusto-conical.

5. The brake housing assembly of claim 1 wherein the base contour is conical or frusto-conical.

6. The brake housing assembly of claim 5 wherein the base contour has a conical or frusto-conical surface that has an included angle of between 110° and 170°.

7. The brake housing assembly of claim 1 wherein the end contour includes an end recess and the base contour includes a base projection and the end recess of the end contour cooperates with the base projection of the base contour to align the bearing support axis with the recess axis.

8. The brake housing assembly of claim 7 wherein the end contour defines part of a torus.

9. The brake housing assembly of claim 8 wherein the projection wall defines an as cast surface.

10. The brake housing assembly of claim 1 wherein the recess wall is cylindrical.

11. The brake housing assembly of claim 10 wherein the projection wall is cylindrical.

12. The brake housing assembly of claim 1 wherein the projection wall is cylindrical.

13. The brake housing assembly of claim 1 wherein the recess wall defines an as cast surface.

14. The brake housing assembly of claim 1 wherein the recess wall is spaced from the projection wall.

15. The brake housing assembly of claim 1 wherein the projection wall defines an as cast surface.

16. A brake housing assembly comprising:
a brake housing having a recess defining a recess axis, the recess having a base and a recess wall, the recess wall having a first recess wall part having a first recess wall peripheral length and a second recess wall part having a second recess wall peripheral length, the first recess wall part being positioned between the second recess wall part and the base and the second recess wall peripheral length being larger than the first recess wall peripheral length;
a bearing support having a projection defining a bearing support axis, the projection having an end and a projection wall, the projection wall having a first projection wall part and a second projection wall part, the first projection wall part being positioned between the second projection wall part and the end; and
the first recess wall part defining a first recess wall contour corresponding to a first projection wall contour of the first projection wall such that with the first recess wall part in engagement with the first projection wall part the first recess wall contour and the first projection wall contour cooperate to align the bearing support axis with the recess axis.

17. The brake housing assembly of claim 16 wherein one or more or all of the first recess wall part, the second recess wall part, the first projection wall part and the second projection wall part are cylindrical.

18. The brake housing assembly of claim 16 wherein the second recess wall part is spaced from the second projection wall part.

19. The brake housing assembly of claim 16 wherein the second recess wall part defines an as cast surface and/or the second projection wall part defines an as cast surface.

* * * * *